United States Patent [19]

Turner et al.

[11] Patent Number: 4,478,727
[45] Date of Patent: Oct. 23, 1984

[54] SODIUM STYRENE SULFONATE-CO-SODIUM-N-(4-SULFOPHENYL)-MALEIMIDE- AN IMPROVED VISCOSITY CONTROL ADDITIVE

[75] Inventors: S. Richard Turner, Bridgewater, N.J.; Thad O. Walker, Humble, Tex.; Warren A. Thaler, Aberdeen, N.J.

[73] Assignee: Exxon Research & Engineering Company, Florham Park, N.J.

[21] Appl. No.: 416,939

[22] Filed: Sep. 13, 1982

[51] Int. Cl.$^3$ ................................................ C09K 7/02
[52] U.S. Cl. ................................ 252/8.5 C; 525/327.5; 526/262
[58] Field of Search ....................... 252/8.5 A, 8.5 C

[56] References Cited

U.S. PATENT DOCUMENTS

| | | | |
|---|---|---|---|
| 2,650,905 | 9/1953 | Fordyce et al. | 252/8.5 |
| 2,718,497 | 9/1955 | Oldham et al. | 252/8.5 |
| 2,979,454 | 4/1961 | Fields et al. | 252/8.5 |
| 3,332,872 | 7/1967 | Oakes | 252/8.5 |
| 3,730,900 | 5/1973 | Perricone et al. | 252/8.5 |

Primary Examiner—Herbert B. Guynn
Attorney, Agent, or Firm—Richard E. Nanfeldt

[57] ABSTRACT

A new copolymer of sodium styrene sulfonate-co-sodium-N-(4-sulfophenyl)-maleimidehas been found to be an improved viscosity control additive for water-based drilling muds.

5 Claims, No Drawings

SODIUM STYRENE SULFONATE-CO-SODIUM-N-(4-SULFOPHENYL)-MALEIMIDE- AN IMPROVED VISCOSITY CONTROL ADDITIVE

FIELD OF THE INVENTION

A new family of viscosification agents based on sodium styrene sulfonate-co-sodium-N-(4-sulfophenyl)-maleimide is described as an improved viscosity control additive for water-based drilling muds. The resultant muds display good viscosity characteristics and good stability when formulated from ionomers having an appropriate sulfonate level, cation type and cosolvent content.

BACKGROUND OF THE INVENTION

In the field of drilling in the exploration for oil and gas, an important component is that of the formulation of drilling muds. Drilling muds are the fluids which are used to maintain pressure, cool drill bits and lift cuttings from the holes and vary in composition over a wide spectrum. Generally, drilling muds are based on aqueous formulations or oil-based formulations.

A conventional water-based drilling mud formulation is comprised of basically the following ingredients: water, a clay such as bentonite, lignosulfonate, a weighing agent such as $BaSO_4$ (Barite), and a caustic material such as sodium hydroxide and a caustic material such as caustic barite, to adjust the pH of the drilling mud to a pH of about 10 to about 10.5.

The continuing search for oil has placed greater demands on the material packages that are utilized to conduct the drilling processes. As drilling depth has increased, so has the bottomhole temperature. In water-based drilling muds, elevated temperatures result in the flocculation of the mud components and thus problematic increases in mud viscosity. Over the years, a progression of different additives has raised the maximum operable bottomhole temperature. Recent disclosures have shown that sulfonated low molecular weight styrene/maleic anhydride copolymer is an effective water-based mud deflocculating additive. This application describes the use of a new sodium styrene sulfonate/sodium-N-(4-sulfophenyl)-maleimide alternating copolymer as an improved additive for high temperature water-based mud deflocculation.

This invention describes an approach to reducing the viscosity of water-based drilling muds which is based on the addition of a water soluble sulfonated copolymer to the mud. The resulting polymer-modified drilling muds display viscosities which are in a desirable range for drilling mud applications after aging at temperatures as high as 400° F. for 24 hours.

The types of sulfonated polymers that are envisioned in the present invention are sodium styrene sulfonate-co-sodium-N-(4-sulfophenyl)-maleimide copolymers.

SUMMARY OF THE INVENTION

The present invention relates to sodium styrene sulfonate-co-sodium-N-(4-sulfophenyl)-maleimide copolymers which function as viscosity reducing agents when added to water-based drilling muds which are the fluids used to maintain pressure, cool drill bits and lift cuttings from the holes in the drilling operation for oil and gas wells. The sodium styrene sulfonate-co-sodium-N-(4-sulfophenyl)-maleimide copolymers contain pendant aryl metal sulfonate groups from each comonomer unit in the copolymer structure.

GENERAL DESCRIPTION

The present invention describes a new viscosification agent for water-based drilling muds which are used during operation of gas and oil wells, wherein this viscosity reducing agent is sodium styrene sulfonate-co-sodium-N-(4-sulfophenyl)-maleimide.

The water-based drilling muds of the instant invention minimally comprise, but can also include other additives; fresh water or salt water, a weighting material and a base to adjust the pH of the water-based drilling mud to between about 10.0 to about 10.5. In general, the specific gravity of about 7 pounds per gallon to about 20 pounds per gallon, more preferably about 10 to about 16, and most preferably about 12 to about 16.

A typical water-based drilling mud, as envisioned by the instant invention, comprises water or salt water; weighting material necessary to give the desired mud density; about 0.25 to about 5 lb/bbl. of the sodium styrene sulfonate-co-sodium-N-(4-sulfophenyl)-maleimide; and sufficient concentration of the base to adjust the pH of the water-based drilling mud to about 10.0 to about 10.5. Higher levels of the sulfonated polymer can be employed but it is not normally economically attractive. The drilling mud also contains a clay such as Bentonite, at a concentration level of about 4 to about 30 lb/bbl., wherein the clay is added to the drilling mud to promote circulation and improve hole stability and cleaning. A lignosulfonate, which is a deflocculation agent, is added to the drilling mud at a concentration level of about 1 to about 30 lb/bbl.

The solid copolymers of the instant invention comprise a copolymer of N-(sodiumsulfophenyl)-maleimide and a sulfonate-containing monomer characterized by the formula:

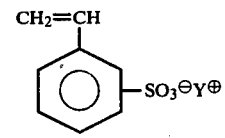

wherein $Y\oplus$ is a cation selected from Groups IA, IIA, IB and IIB of the Periodic Table or an amine of the formula:

where $R_1$, $R_2$ and $R_3$ can be aliphatic groups of $C_1$ to $C_{12}$ or hydrogen and the copolymer being water soluble.

The monomers used in the free radical solution copolymerization process are N-(4-sodiumsulfophenyl)-maleimide and a sulfonated styrenic comonomer.

The comonomers are dissolved in a water phase in the presence of a suitable free radical initiator, wherein the temperature is sufficient to initiate polymerization. The resultant polymer can be precipitated and filtered and dried under high vacuum.

The copolymers formed from the free radical solution copolymerization of the instant invention can be generally described as having an $\overline{M}_n$ of about 5,000 to about 200,000, more preferably about 10,000 to about 100,000.

The formed copolymers contain about 50 mol. % of N-(4-sodiumsulfophenyl)-maleimide. The sulfonated styrenic comonomer content is also about 50 mol. %.

The sulfonated styrenic monomers of the instant invention which are water soluble can be generally described as monomers having unsaturation and a metal or amine sulfonate group. The metal or amine neutralized sulfonate monomer is characterized by the formula:

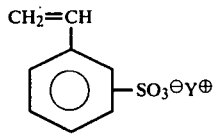

wherein $Y^\oplus$ is a cation selected from Groups IA, IIA, IB and IIB of the Periodic Table or an amine of the formula:

where $R_1$, $R_2$ and $R_3$ can be aliphatic groups of $C_1$ to $C_{12}$ or hydrogen. Particularly suitable metal cations are sodium, potassium and zinc, and an especially preferred metal cation is sodium. A typical, but non-limiting example of suitable sulfonate-containing monomers is:

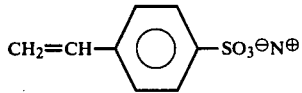

sodium styrene sulfonate.

An especially preferred sulfonate-containing monomer is a metal sulfonate styrene. The molar ratio of sulfonate-containing monomer to the N-(4-sodiumsulfophenyl)-maleimide is about 50 to about 50.

The N-(4-sodiumsulfophenyl)-maleimide monomer used in the free radical solution copolymerization is prepared by a two-step process. In the first step, maleic anhydride is reacted with sulfanilic acid, sodium salt monohydrate in a methanol solution at room temperature to form a half imide according to the reaction scheme:

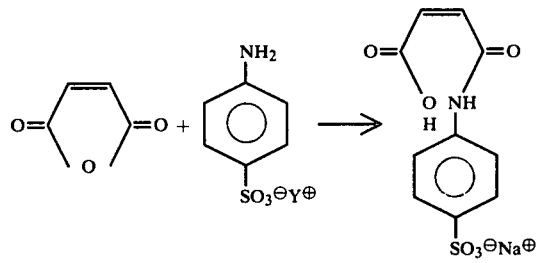

The formed precipitate of the half imide was recovered by filtration and dried under high vacuum.

In the second step, the previously formed half imide is refluxed with sodium acetate and acetic anhydride until a tannish color developed. After cooling, the formed precipitate of the N-(4-sodiumsulfophenyl)-maleimide is formed. The reaction scheme is:

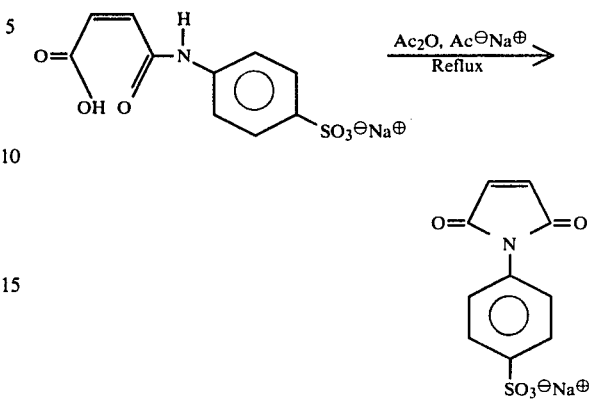

The copolymerization of the sulfonate-containing monomer with the N-(4-sodiumsulfophenyl)-maleimide comprises the steps of dissolving both the sulfonate-containing monomer and the N-(4-phenylsulfophenyl)-maleimide in deoxygenated water at 50° C. under $N_2$ positive pressure and a water soluble peroxy initiator is added to the solution. The reaction is allowed to proceed for about 1 to about 48 hours, more preferably about 6 to about 24. Acetone is added to the reaction solution and the resultant precipitate is filtered and dried under high vacuum.

The water soluble peroxy initiators are selected from the group consisting of potassium persulfate and ammonium persulfate. The concentration of initiator is about 5 to about 0.1 wt. % based on total reaction solution, more preferably about 2 to about 0.5.

Water soluble redox initiators can also be employed in this free radical solution copolymerization.

Chain transfer agents can be readily employed in the instant polymerization process for controlling the molecular weight of the resultant copolymer.

A second route to these copolymers involves the modification of preformed alternating styrene/maleic anhydride copolymers. This is accomplished sequentially by first sulfonating the styrenic pendant unit with $SO_3$, followed by addition of sulfanilic acid to the enchained succinic anhydride units. The preformed polymer can range in molecular weight from 1000 to 500,000.

DETAILED DESCRIPTION OF THE PREFERRED EMBODIMENTS

EXAMPLE 1

Preparation of Sodium Styrene Sulfonate-Co-Sodium-N-(4-sulfo-phenyl)-Maleimide by Copolymerization To a stirred solution of 10.0 g. N-(4-sodium-sulfo-phenyl)-maleimide (36.4 mmole) and 7.49 g. sodium-styrenesulfonate (36.4 mmole) in 100 ml. deoxygenated $H_2O$ at 50° C. under $N_2$ positive pressure was added 0.01 g. potassiumperoxydisulfate (0.1 wt. %). The mixture was allowed to react for 24 hours then the product was precipitated by addition of the solution to 2000 ml. acetone. The pinkish, fibrous precipitate (VII) was filtered and dried under high vacuum giving 14.28 g. (81.6% yield).

IR (film from H$_2$O): 3100 cm$^{-1}$ (weak), 3060 cm$^{-1}$, (weak), 2190 cm$^{-1}$ (weak), 1770 cm$^{-1}$, 1700 cm$^{-1}$, 1600 cm$^{-1}$, 1200 cm$^{-1}$, 1120 cm$^{-1}$, 1035 cm$^{-1}$, 830 cm$^{-1}$, 710 cm$^{-1}$.

Analysis Calcd. N, 2.92; S, 13.36; Found N, 3.05; S, 13.57.

EXAMPLE 2

Preparation of Sodium Styrene Sulfonate-Co-sodium-N(-4-Sulfophenyl)-Maleimide by Polymer Modification Alternating 1:1 styrene maleic anhydride copolymer, 202 g. was combined with 2000 ml. dichloroethane and 18.2 g. triethylphosphate; 88 g. of sulfur trioxide was added slowly over about 15 minutes. The mixture was stirred at ambient for several hours and collected by filtration. The solid was washed with several portions of ether and dried in vacuo. Titration indicated that about two-thirds of the available styrene units were sulfonated.

Sulfanilic acid, 17.3 g., was dissolved in 200 ml. of water combined with 13.3 g. of 50% sodium hydroxide solution. The sulfonated copolymer, 25.5 g., was added and stirred until dissolved. The solution was placed in a pressure reactor which was heated by a 190° C. oil bath for 16 hours. The solution was spray-dried using 125° C. external temperature, and a 75° C. outlet temperature. The product was a fine powder weighing 35 g.

EXAMPLE 3

Test Mud Formulation

The following is a typical formulation for a fresh water lignosulfonate mud. The density of this system can be adjusted as desired by the addition of Barite (BaSO$_4$).

| Fresh water | 350 cc |
| Bentonite | 22 lb/bbl. |
| Lignosulfonate | 5 lb/bbl. |
| pH | 10–10.5 w. NaOH |

The Bentonite is added slowly to the fresh water so as to obtain maximum yield or viscosity. This slurry is then aged overnight at 150° F. To the cooled mud is added the lignosulfonate and the pH is adjusted to 10 to 10.5 with caustic. Barite is added for the desired weight (14.5 lb/gal). The mud is aged again overnight at 150° F. to insure chemical equilibrium. The pH of the cooled mud is readjusted to 10 to 10.5 with caustic. To aliquots of this base mud were added the dispersant stabilizers. These samples were bombed at 400° F. for 16 hours and then the rheological properties were measured.

The results of testing (I) in comparison to the commercial Mil-Temp deflocculation polymer are shown in Table I. Significant improvements in the deflocculation efficacy of (I) versus Mil-Temp were observed. At the one pound per barrel additive level, the 0 and 10 min gel strengths are reduced by a factor of 5.5 to 7 and the 600 and 300 rpm viscosities also significantly reduced.

TABLE I

Comparison of Stabilizing Ability of (Copolymer (Example I) and Mil-Temp

| Material | Conc. lb/bbl. | 600[a] | 300[b] | PV[c] | YP[d] | Gels[e] 0 | Gels[e] 10 | pH | Temperature |
|---|---|---|---|---|---|---|---|---|---|
| Base | | >300 | 294 | | | 230 | 273 | 10.4 | 400° F. |
| + Copolymer (Example I) | ½ | >300 | 195 | | | 5 | 7 | 10.4 | 400° F. |
| + Copolymer (Example I) | 1 | 245 | 150 | 95 | 55 | 4 | 4 | 10.4 | 400° F. |
| + Copolymer (Example I) | 2 | 252 | 167 | 85 | 82 | 4 | 5 | 10.4 | 400° F. |
| + Mil-Temp | 1 | >300 | >300 | | | 22 | 29 | 10.7 | 400° F. |
| + Mil-Temp | 2 | >300 | 280 | | | 10 | 12 | 10.8 | 400° F. |

[a] = 600 rpm Fann Viscosity
[b] = 300 rpm Fann Viscosity
[c] = plastic viscosity
[d] = yield point
[e] = 0 and 10 min. gel strengths

What is claimed is:

1. A water-based drilling mud which comprises:
   (a) water;
   (b) about 4 to about 30 lbs/bbl. of a clay;
   (c) about 1 to about 30 lbs/bbl of a lignosulfonate;
   (d) weighting material of suffcient quantity necessary to achieve the desired density;
   (e) about 0.25 to about 5 lbs/bbl. of a sodium styrene sulfonate co-sodium-N-(4-sulfophenyl)-maleimide copolymer, said copolymer being (1) prepared by copolymerization of sodium styrene sulfonate and sodium-N-(4-sulfophenyl)-maleimide and having an $\overline{M}n$ of about 10,000 to about 100,000, or (2) prepared by modification of a preformed alternating styrene/maleic anhydride copolymer by sequentially sulfonating the styrene pendant unit with SO$_3$ followed by addition of sulfanilic acid to the enchained succinic anhydride units, said preformed copolymer having a molecular weight of from 1,000 to 500,000; and
   (f) base of sufficient quantity to adjust the pH of the water-based drilling mud to about 10 to about 10.5

2. A water-based drilling mud according to claim wherein said sodium styrene sulfonate co-sodium-N-(4-sulfophenyl)-maleimide copolymer is prepared by the copolymerization of sodium styrene sulfonate and sodium-N-(4-sulfophenyl)-maleimide.

3. A water-based drilling mud according to claim wherein said clay is Bentonite.

4. A water-based drilling mud according to claim wherein said base is sodium hydroxide.

5. A water-based drilling mud according to claim wherein said sodium styrene sulfonate-co-sodium-N-(4-sulfophenyl)-maleimide copolymer is prepared by modification of preformed styrene-maleic anhydride copolymer.

* * * * *